United States Patent
Kasher et al.

(10) Patent No.: US 11,240,682 B2
(45) Date of Patent: Feb. 1, 2022

(54) SPLIT SECTOR LEVEL SWEEP USING BEAMFORMING REFINEMENT FRAMES

(71) Applicant: QUALCOMM Incorporated, San Diego, CA (US)

(72) Inventors: Assaf Yaakov Kasher, Haifa (IL); Amichai Sanderovich, Atlit (IL); Solomon Trainin, Haifa (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 15/885,415

(22) Filed: Jan. 31, 2018

(65) Prior Publication Data

US 2018/0234860 A1   Aug. 16, 2018

Related U.S. Application Data

(60) Provisional application No. 62/458,606, filed on Feb. 14, 2017.

(51) Int. Cl.
*H04B 7/00* (2006.01)
*H04W 16/28* (2009.01)
*H04B 7/06* (2006.01)
*H04B 7/08* (2006.01)

(52) U.S. Cl.
CPC ............ *H04W 16/28* (2013.01); *H04B 7/063* (2013.01); *H04B 7/0617* (2013.01); *H04B 7/0632* (2013.01); *H04B 7/0695* (2013.01); *H04B 7/088* (2013.01)

(58) Field of Classification Search
CPC ... H04W 76/02; H04W 76/025; H04W 88/08; H04W 88/10; H04W 92/10
USPC .......................... 370/310, 328, 329, 339, 465
See application file for complete search history.

(56) References Cited

U.S. PATENT DOCUMENTS

| | | | |
|---|---|---|---|
| 8,422,961 B2 * | 4/2013 | Kafle .................. | H01Q 3/26 342/368 |
| 8,509,130 B2 * | 8/2013 | Liu .................... | H04B 7/088 370/310 |
| 8,611,288 B1 * | 12/2013 | Zhang ................ | H04W 24/02 370/235 |
| 8,982,803 B1 * | 3/2015 | Zhang ................ | H04B 7/0619 370/329 |
| 9,048,894 B2 * | 6/2015 | Wang .................. | H04B 7/043 |
| 9,967,019 B2 * | 5/2018 | Takahashi ........... | H04B 17/318 |
| 10,056,958 B2 * | 8/2018 | Rajagopal ............ | H04B 7/063 |
| 2015/0249929 A1 * | 9/2015 | Irie ..................... | H04B 7/0695 370/329 |
| 2017/0085306 A1 * | 3/2017 | Cariou ................ | H04B 7/0452 |
| 2018/0192411 A1 * | 7/2018 | Takahashi ........... | H04W 72/046 |
| 2018/0198505 A1 * | 7/2018 | Eitan .................. | H04B 7/0491 |
| 2018/0219597 A1 * | 8/2018 | Irie ..................... | H04B 7/10 |

(Continued)

FOREIGN PATENT DOCUMENTS

WO    2010099040 A1    9/2010

OTHER PUBLICATIONS

IEEEE, IEEE 802.11 standard, 2016, IEEE, 3534 pages.*

(Continued)

*Primary Examiner* — Dmitry Levitan
(74) *Attorney, Agent, or Firm* — Patterson+ Sheridan, L.L.P.

(57) ABSTRACT

Certain aspects of the present disclosure provide methods and apparatus for enhancing a beamforming training procedure.

42 Claims, 14 Drawing Sheets

(56) References Cited

U.S. PATENT DOCUMENTS

2018/0248603 A1\* 8/2018 Kasher ................ H04B 7/0621
2019/0036572 A1\* 1/2019 Kasher ................ H04B 7/0408

OTHER PUBLICATIONS

International Search Report and Written Opinion—PCT/US2018/016346—ISA/EPO—dated May 16, 2018.
"ISO/IEC/IEEE International Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications Amendment 3: Enhancements", IEEE Standard, IEEE, Piscataway, NJ, USA, Mar. 14, 2014 (Mar. 14, 2014), XP068070330, pp. 1-634 (incl. Index), ISBN: 978-0-7381-9032-7.
Taiwan Search Report—TW107103778—TIPO—dated Aug. 13, 2021.

\* cited by examiner

700A

702A
MEANS FOR GENERATING A PLURALITY OF RECEIVE BEAMFORMING REFINEMENT FRAMES, EACH RECEIVE BEAMFORMING REFINEMENT FRAME COMPRISING A PREAMBLE, A DATA FIELD, AT LEAST ONE BEAMFORMING TRAINING FIELD, AND AN INDICATION OF WHETHER THE RECEIVE BEAMFORMING REFINEMENT FRAME IS A LAST TRANSMIT BEAMFORMING REFINEMENT FRAME IN A RECEIVE BEAMFORMING REFINEMENT PHASE

704A
MEANS FOR OUTPUTTING THE RECEIVE BEAMFORMING REFINEMENT FRAMES FOR TRANSMISSION USING AT LEAST ONE FIRST TRANSMIT BEAMFORMING SECTOR

FIG. 7A

1000A 

┌─ 1002A
MEANS FOR OBTAINING FROM A WIRELESS NODE, DURING A RECEIVE BEAMFORMING PHASE, A PLURALITY OF RECEIVE BEAMFORMING REFINEMENT FRAMES, EACH RECEIVE BEAMFORMING REFINEMENT FRAME COMPRISING A PREAMBLE AND DATA FIELD OBTAINED VIA A FIRST RECEIVE BEAMFORMING SECTOR, AT LEAST ONE BEAMFORMING TRAINING FIELD OBTAINED VIA A DIFFERENT RECEIVE BEAMFORMING SECTOR, AND AN INDICATION OF WHETHER THE RECEIVE BEAMFORMING REFINEMENT FRAME IS A LAST RECEIVE BEAMFORMING REFINEMENT FRAME IN THE RECEIVE BEAMFORMING REFINEMENT PHASE

↓

┌─ 1004A
MEANS FOR PROCESSING THE TRAINING FIELDS TO EVALUATE THE DIFFERENT RECEIVE BEAMFORMING SECTORS

FIG. 10A

SPLIT SECTOR LEVEL SWEEP USING BEAMFORMING REFINEMENT FRAMES

CROSS-REFERENCE TO RELATED APPLICATION & PRIORITY CLAIM

This application claims benefit of and priority to U.S. Provisional Application No. 62/458,606, filed Feb. 14, 2017, which is herein incorporated by reference in its entirety for all applicable purposes.

FIELD

Certain aspects of the present disclosure generally relate to wireless communications and, more particularly, to enhancing a beamforming training procedure.

BACKGROUND

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second (Gbps). Certain wireless communications standards, such as the Institute of Electrical and Electronics Engineers (IEEE) 802.11 standard, provide throughput in the multi-Gbps range. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

The procedure to adapt the transmit and receive antennas, referred to as beamform training, may be performed initially to establish a link between devices and may also be performed periodically to maintain a quality link using the best transmit and receive beams.

Unfortunately, beamforming training represents a significant amount of overhead, as the training time reduces data throughput. The amount of training time increases as the number of transmit and receive antennas increase, resulting in more beams to evaluate during training.

This increase in training time may have an adverse effect on data throughput and impact performance, particularly for applications that require low latency, such as virtual reality (VR) and augmented reality (AR) applications.

SUMMARY

Certain aspects of the present disclosure provide an apparatus for wireless communications. The apparatus generally includes a processing system configured to generate a plurality of transmit beamforming refinement frames for a sector sweep, each transmit beamforming refinement frame comprising a preamble, a data field, at least one beamforming training field, and an indication of whether the transmit beamforming refinement frame is a last transmit beamforming refinement frame in the sector sweep, a first interface configured to output the transmit beamforming refinement frames for transmission using a first transmit beamforming sector for the preambles and data fields and using one or more of second transmit beamforming sectors for each beamforming field, and a second interface configured to obtain a first feedback frame from a wireless node, after the last transmit beamforming refinement frame in the sector sweep was output for transmission, the first feedback frame indicating one or more of the second transmit beamforming sectors, wherein the apparatus is configured to use the indicated one or more of the second transmit beamforming sectors for communication with the wireless node.

Certain aspects of the present disclosure provide an apparatus for wireless communications. The apparatus generally includes a processing system configured to generate a plurality of receive beamforming refinement frames, each receive beamforming refinement frame comprising a preamble, a data field, at least one beamforming training field, and an indication of whether the receive beamforming refinement frame is a last receive beamforming refinement frame in a receive beamforming refinement phase and a first interface is configured to output the receive beamforming refinement frames for transmission using at least one first transmit beamforming sector.

Certain aspects of the present disclosure provide an apparatus for wireless communications. The apparatus generally includes a first interface configured to obtain, from a wireless node, a plurality of transmit beamforming refinement frame from a wireless node during a sector sweep, wherein a preamble and data portion of each transmit beamforming refinement frame is obtained via a first receive beamforming sector, training fields of the transmit beamforming refinement frames are obtained while the apparatus is in an omnidirectional receive antenna mode, and each transmit beamforming refinement frame has an indication of whether the transmit beamforming refinement frame is a last transmit beamforming refinement frame in the sector sweep, and a processing system configured to determine, based on the indication, that the last transmit beamforming refinement frame in the sector sweep has been obtained, after the determination, select at least one first transmit beamforming sector that was used to transmit one of the training fields, based on received signal quality of the one of the training fields, and generate a first feedback frame indicating the selected first transmit beamforming sector; and a second interface configured to output the first feedback frame for transmission to the wireless node.

Certain aspects of the present disclosure provide an apparatus for wireless communications. The apparatus generally includes a first interface configured to obtain from a wireless node, during a receive beamforming phase, a plurality of receive beamforming refinement frames, each receive beamforming refinement frame comprising a preamble and data field obtained via a first receive beamforming sector, at least one beamforming training field obtained via a different receive beamforming sector, and an indication of whether the receive beamforming refinement frame is a last receive beamforming refinement frame in the receive beamforming refinement phase; and a processing system configured to process the training fields to evaluate the different receive beamforming sectors.

Aspects of the present disclosure also provide various methods, means, and computer program products corresponding to the apparatuses and operations described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7A illustrates example components capable of performing the operations shown in FIG. 7.

FIG. 10A illustrates example components capable of performing the operations shown in FIG. 10.

DETAILED DESCRIPTION

Figure 1:
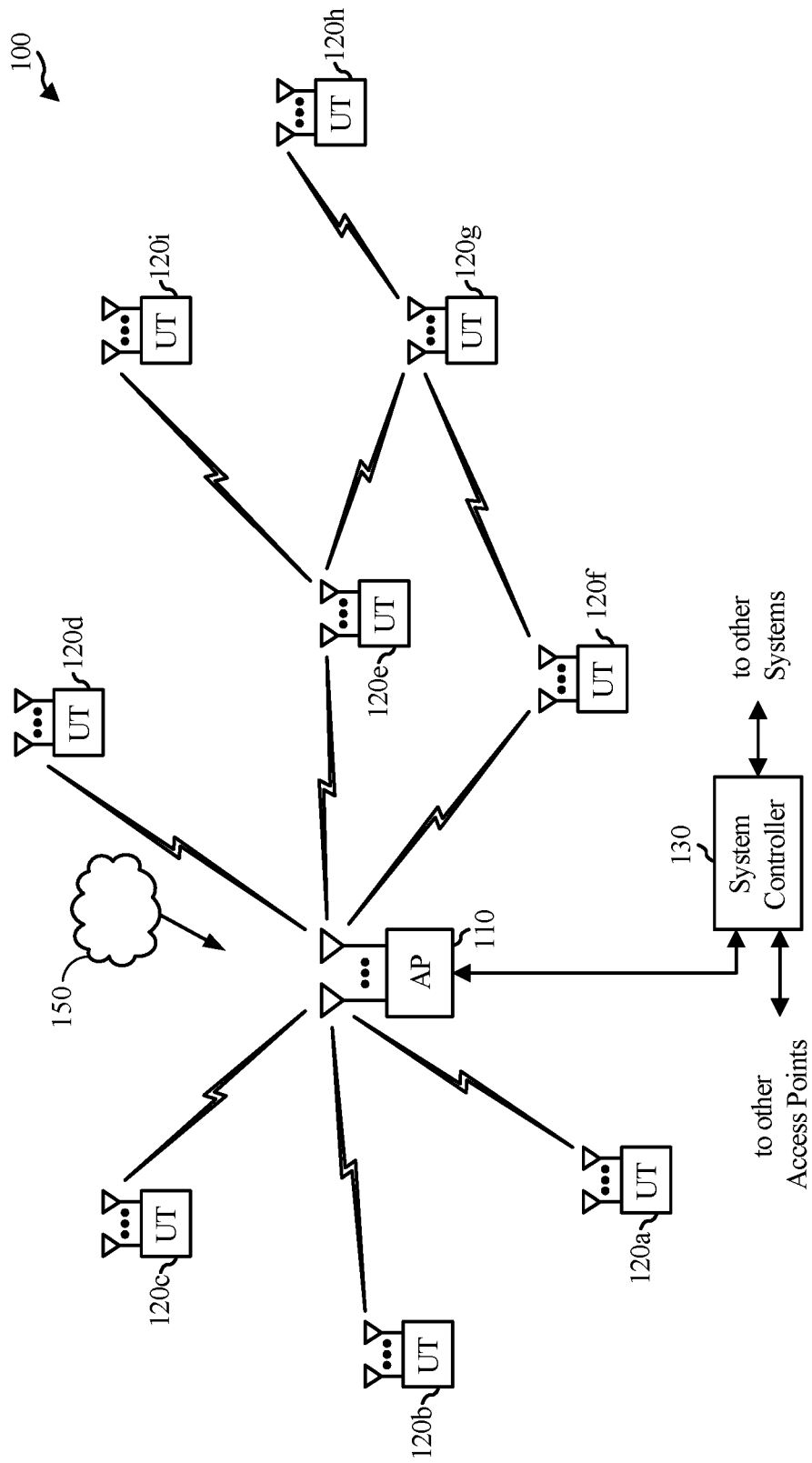
FIG. 1 is a diagram of an example wireless communications network, in accordance with certain aspects of the present disclosure.

Certain aspects of the present disclosure provide methods and apparatus for enhancing a beam refinement phase (BRP) of a beamforming training procedure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
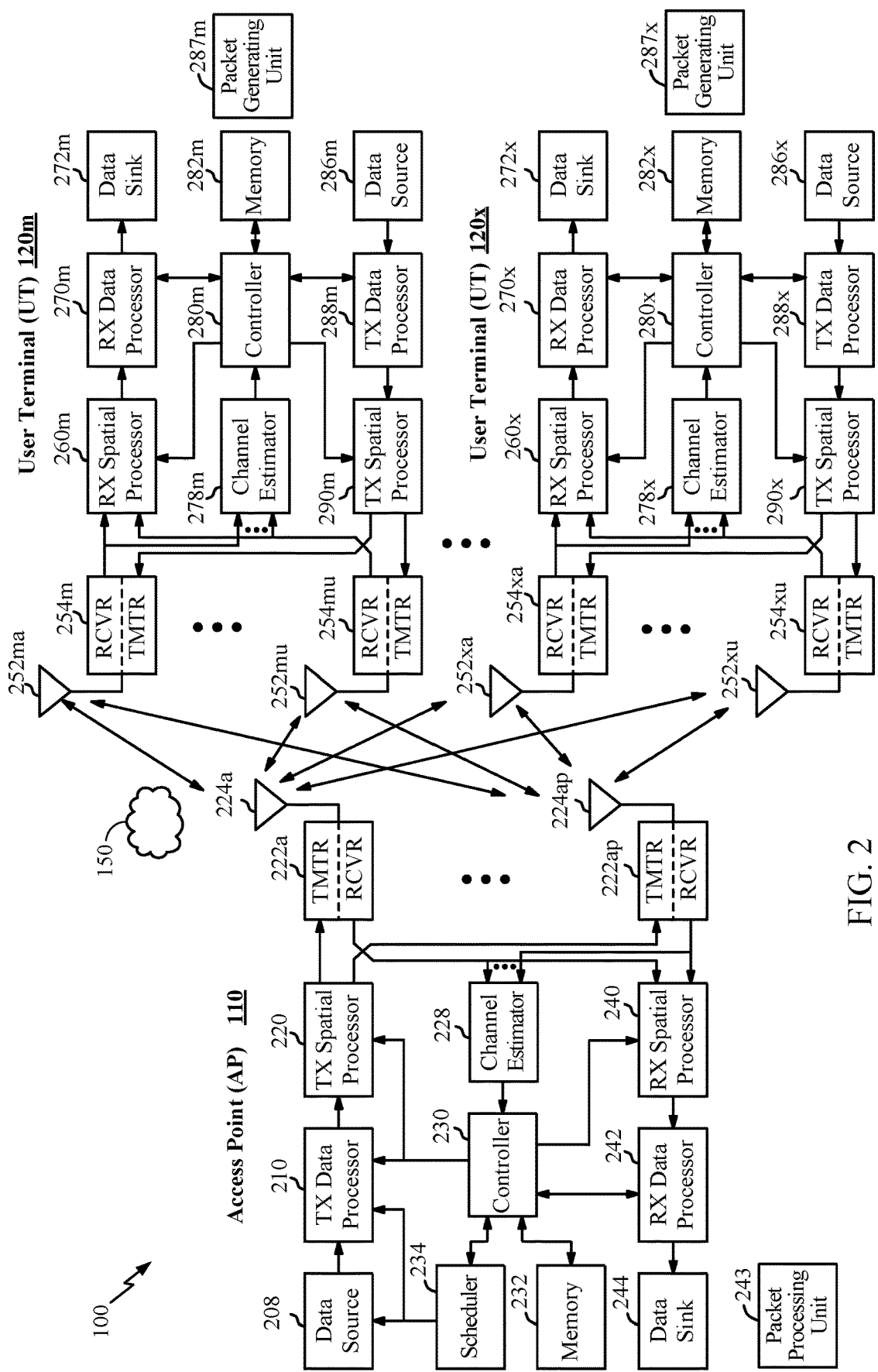
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
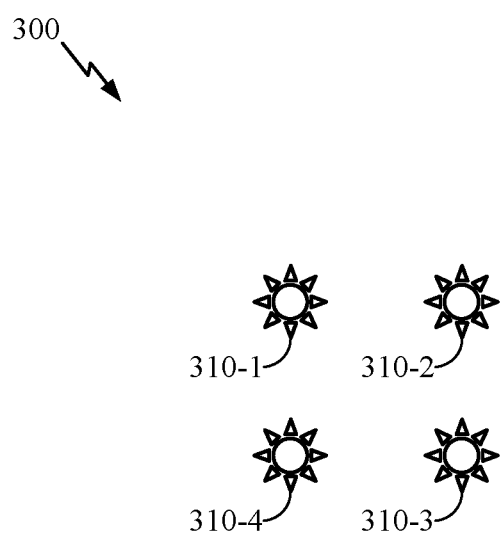
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

Example Beamforming Training Procedure

In high frequency (e.g., mmWave) communication systems like 60 GHz (e.g., 802.11ad and 802.11ay), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication.

Figure 4:
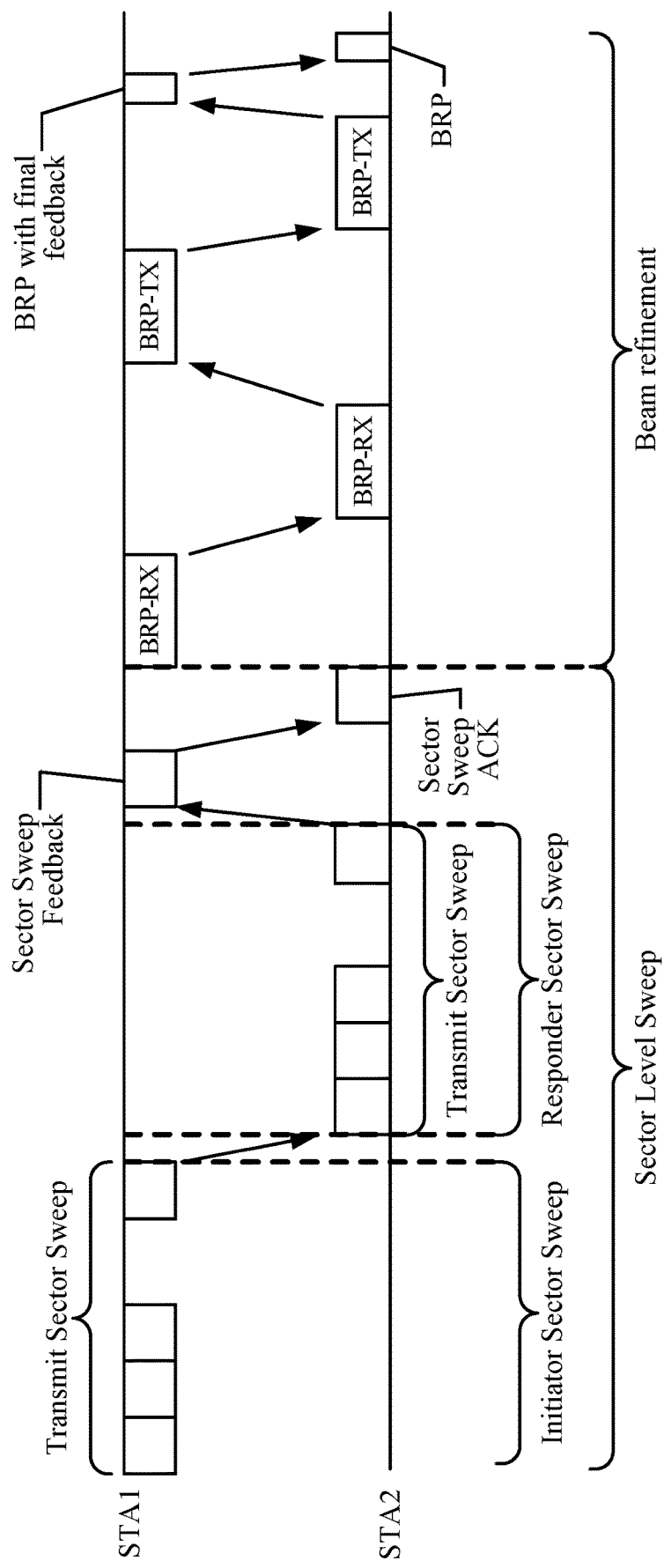
FIG. 4 illustrates an example beamforming training procedure.

As illustrated in FIG. 4, BF training typically involves a bidirectional sequence of BF training frame transmissions between stations (STA1 and STA2 in this example) that uses a sector sweep (SSW) followed by a beam refining phase (BRP). For example, an AP or non-AP STA may initiate such a procedure to establish an initial link. During the sector sweep, each transmission is sent using a different sector (covering a directional beam of a certain width) identified in the frame and provides the necessary signaling to allow each STA to determine appropriate antenna system settings for both transmission and reception.

As illustrated in FIG. 4, in all cases where the AP has large number of elements, the sectors used are relatively narrow, causing the SLS (Sector Level Sweep) process to be long. The higher the directivity more sectors are needed and therefore the SLS is longer. As an example, an AP with an array of 100 antenna elements may use 100 sectors. This situation is not desired since SLS is an overhead affecting throughput, power consumption and induces a gap in the transport flow.

Various techniques may be used to try and reduce throughput time. For example, short SSW (SSSW) messages may be used instead of the SSW messages, which may save some time (e.g., about 36%). In some cases, throughput may be reduced by utilizing the fact that in such APs the transmitter can transmit via several RF chains. This facilitates transmission in parallel on several single channels. It can shorten the scan by the factor number of frequencies (2 or 3 or 4). Unfortunately, this approach may require the receiver to support the multiple frequencies scan, and it is not backward compatible (e.g., with 802.11ad devices) and requires the stations to fully be aware of this special mode in advance. In some cases, the Tx SLS+Rx SLS or the Tx SLS+Rx BRP may be replaced with a new Tx+Rx BRP where only one "very" long BRP message is used with many TRN units. Unfortunately, this method requires a very long message but may be able to support multiple STAs in parallel, making it efficient but only in cases with a large number of STAs.

Example Split Sector Level Sweep Using Beamforming Refinement Frames

As noted above, in systems such as 802.11ay, to get high gain phased array antennas to point in the right direction, a beamforming training algorithm is used. The sector level sweep descried above may be performed for the case when the two devices don't have a working (control PHY) link. Unfortunately, the TX sector sweep is very long, especially, for the case that the arrays have a large number (e.g., 256/128) of elements. Further, to maintain link quality in data intensive uses, such as Virtual Reality/Augmented Reality (VR/AR), frequent beamforming training may be performed.

To enable fast and frequent beamforming training, in some cases, relatively short BRP packets may be used, with TRN fields used to perform the training (rather than separate SLS frames). However, even with BRP frames, the TRN sequence may be relatively long and may, thus, interfere data transmission for too long (for low latency applications).

Aspects of the present disclosure, however, may help reduce latency associated with beamforming training by splitting a sector level sweep (SLS) into smaller parts, which may allow for data transmissions between.

Figure 5:
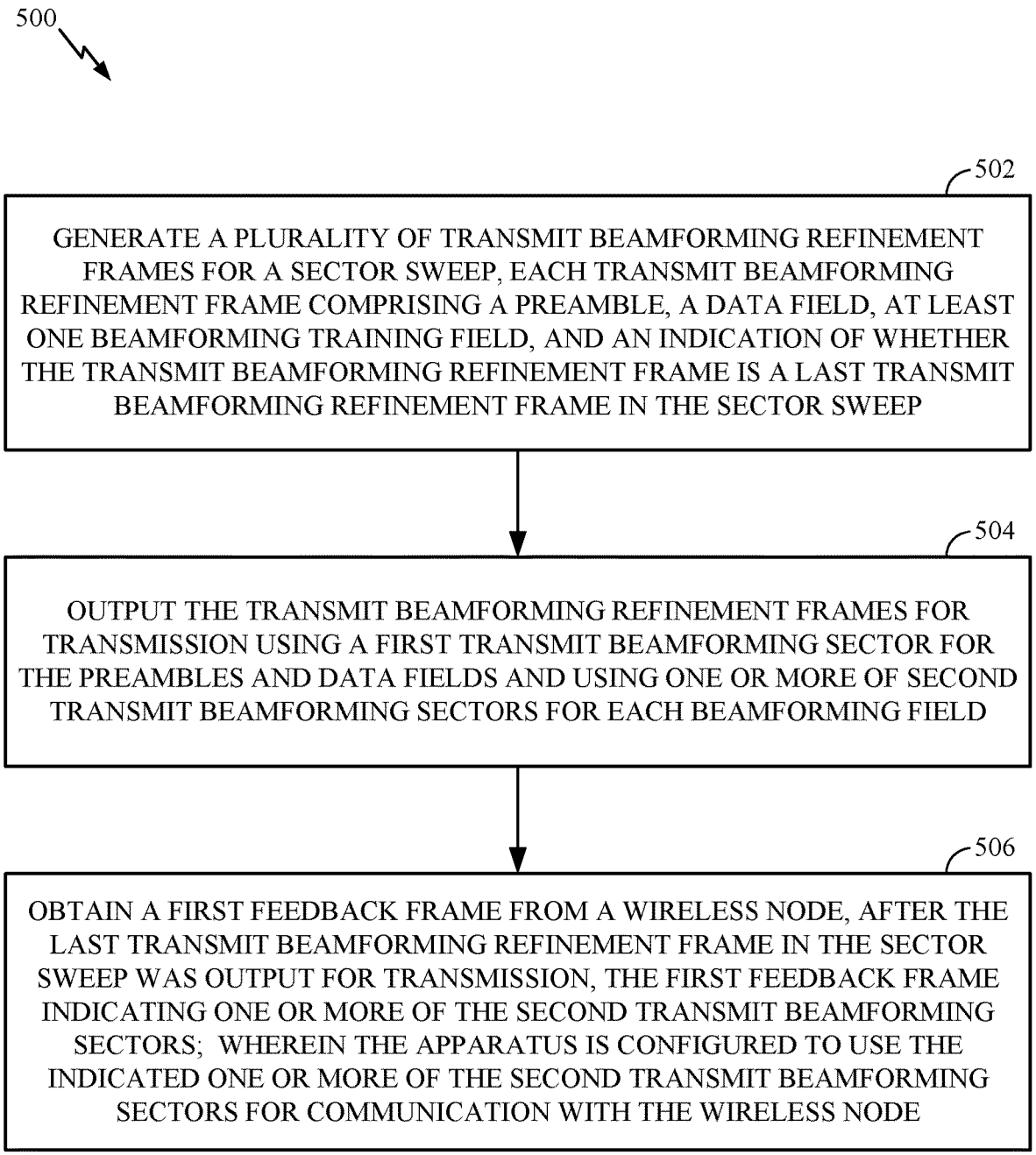
FIG. 5 illustrates example operations for performing transmit beamforming training by an initiator, in accordance with certain aspects of the present disclosure.

FIG. 5 illustrates example operations 500 for performing transmit beamforming training as a split sector level sweep with BRP frames by an initiator, in accordance with certain aspects of the present disclosure.

Operations 500 begin, at 502, by generating a plurality of transmit beamforming refinement frames for a sector sweep, and each transmit beamforming refinement frame comprises a preamble, a data field, at least one beamforming training field, and an indication of whether the transmit beamforming refinement frame is a last transmit beamforming refinement frame in the sector sweep. In aspects, the indication is a countdown or counter of the beamforming refinement frames that are transmitted during the sector sweep. For instance, the indication of the first frame may be (N−1), where N is the total number of frames that are transmitted, and the remaining indications may countdown from (N−1), until the indication of the last frame is zero, providing an indication that the sector sweep is complete. Accordingly, the counter also provides an indication of the start of the sector sweep, a continuation of the sector sweep, and the end of the sector sweep. At 504, the transmit beamforming refinement frames are output for transmission using a first transmit beamforming sector for the preambles and data fields and using one or more of second transmit beamforming sectors for each beamforming field (e.g., the first and second transmit BF sectors can be the same or different). At 506, the initiator obtains a first feedback frame from a wireless node, after the last transmit beamforming refinement frame in the sector sweep was output for transmission, the first feedback frame indicating one or more of the second transmit beamforming sectors. The initiator may then be configured to use the indicated one or more of the second transmit beamforming sectors for communication with the wireless node. The first interface may be configured to output each beamforming field for transmission via a different set of the second transmit beamforming sectors.

Figure 6:
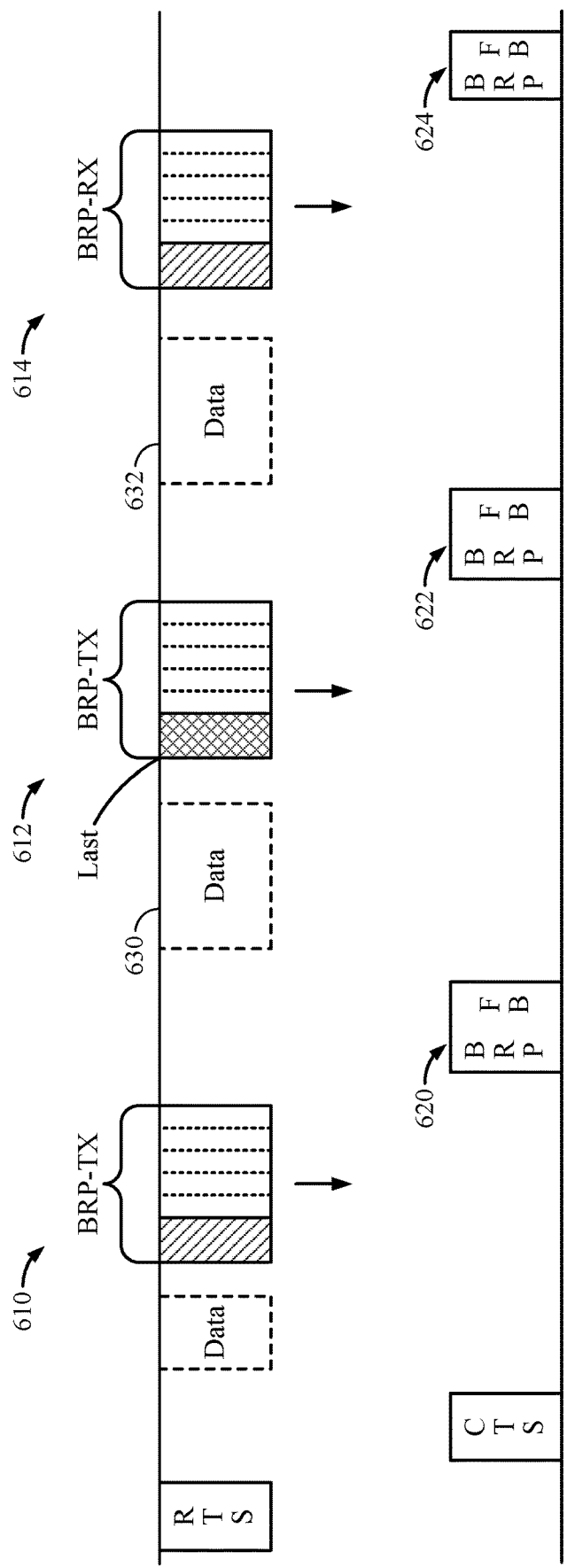
FIG. 6 illustrates an example split sector sweep using beam refinement frames, in accordance with certain aspects of the present disclosure.

FIG. 6 illustrates an example version of a split sector sweep using beam refinement frames, in accordance with certain aspects of the present disclosure (e.g., with an initiator acting in accordance with FIG. 5). As illustrated, the split SLS may be performed inside a transmit opportunity (TxOp) in which data may also be transmitted. For example, the request to send (RTS)/clear to send (CTS) handshaking at the beginning of the split SLS Protocol may ensure that a control mode PHY connection between the STAs exists. It may also be possible to use a Grant/Grant ACK combination (rather than an RTS/CTS) if the TXOp includes only beamforming training.

As illustrated, the training may start with the initiator sending a BRP-TX packet (frame) 610 that has an indication of an SLS start (and may also have an indication for the responder to switch to an omni-RX for training). The data part of the packet may be transmitted using the known good TX direction (e.g., as a result of previous training). The responder may receive the data and preamble parts of the packet using a directed RX beam, but may switch to the omni RX mode to receive the training fields. As illustrated in FIG. 6, the responder may respond with a BRP feedback packet 620 indicating that the SLS was received. Now (additional) data (e.g., data frame(s) 630) may be transmitted (between BRP-TX frames) using the best known TX direction (e.g., as a result of previous training). Thus, this enables data transmission to continue during the SLS and reduces the latency caused by the SLS.

The split SLS protocol may continue with another BRP-TX packet (not shown) from the initiator, which may contain an indication of an unfinished SLS, which may solicit a proper response from the responder.

After some more possible data transmission, the initiator sends a BRP-TX packet 612 with an indication of a last packet in the SLS. In response to this last BRP-TX frame, the responder may send a BRP feedback packet 622 with a list of (one or more) transmit sectors and their signal quality. In the same feedback packet, the responder may also send a request for BRP-RX training with an indication of how many training fields it needs.

Figure 7:
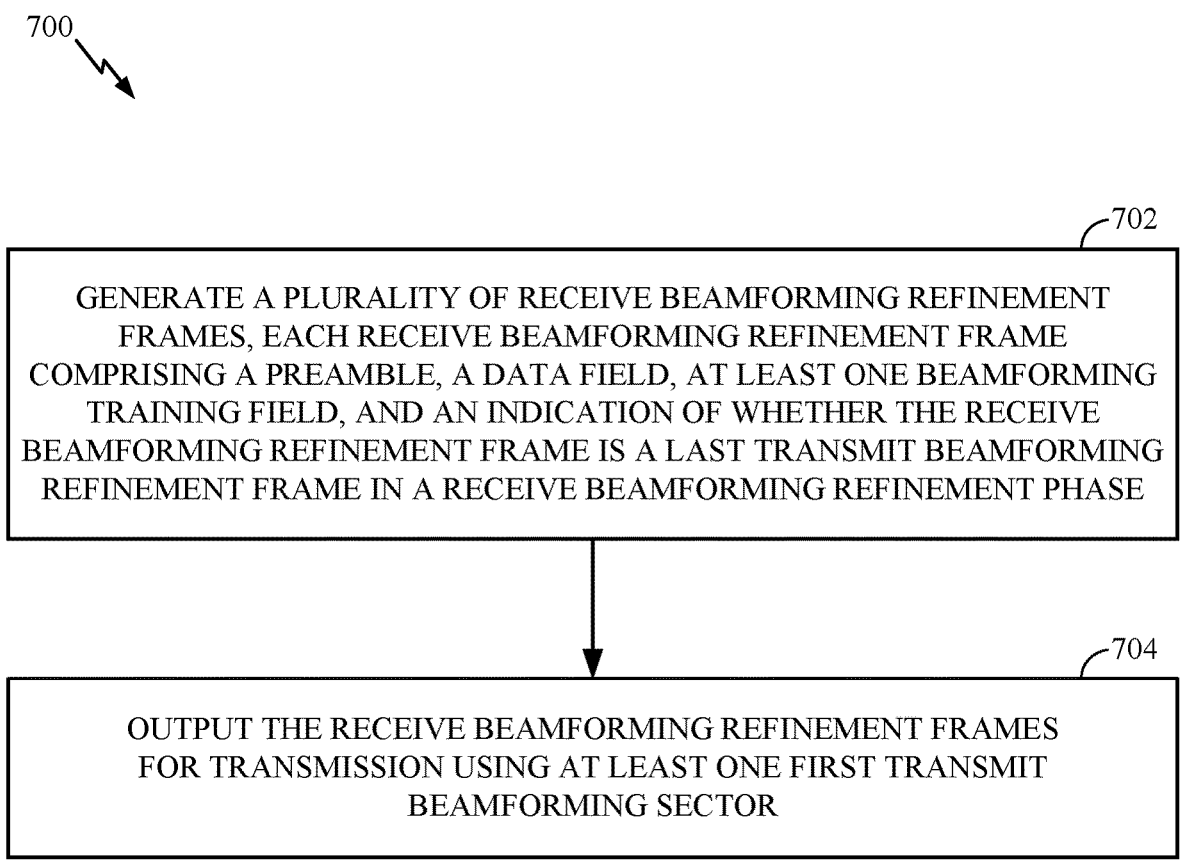
FIG. 7 illustrates example operations for performing receive beamforming training by an initiator, in accordance with certain aspects of the present disclosure.

FIG. 7 illustrates example operations 700 for performing receive beamforming training as a split sector level sweep with BRP frames by an initiator, in accordance with certain aspects of the present disclosure. Operations 700 may be performed independently or may be performed after performing split SLS transmit beamforming training (e.g., in accordance with operations 500).

Operations 700 begin, at 702, by generating a plurality of receive beamforming refinement frames, and each receive beamforming refinement frame comprises a preamble, a data field, at least one beamforming training field, and an indication of whether the receive beamforming refinement frame is a last receive beamforming refinement frame in a receive beamforming refinement phase. At 704, the initiator outputs the receive beamforming refinement frames for transmission using at least one first transmit beamforming sector.

Figure 8:
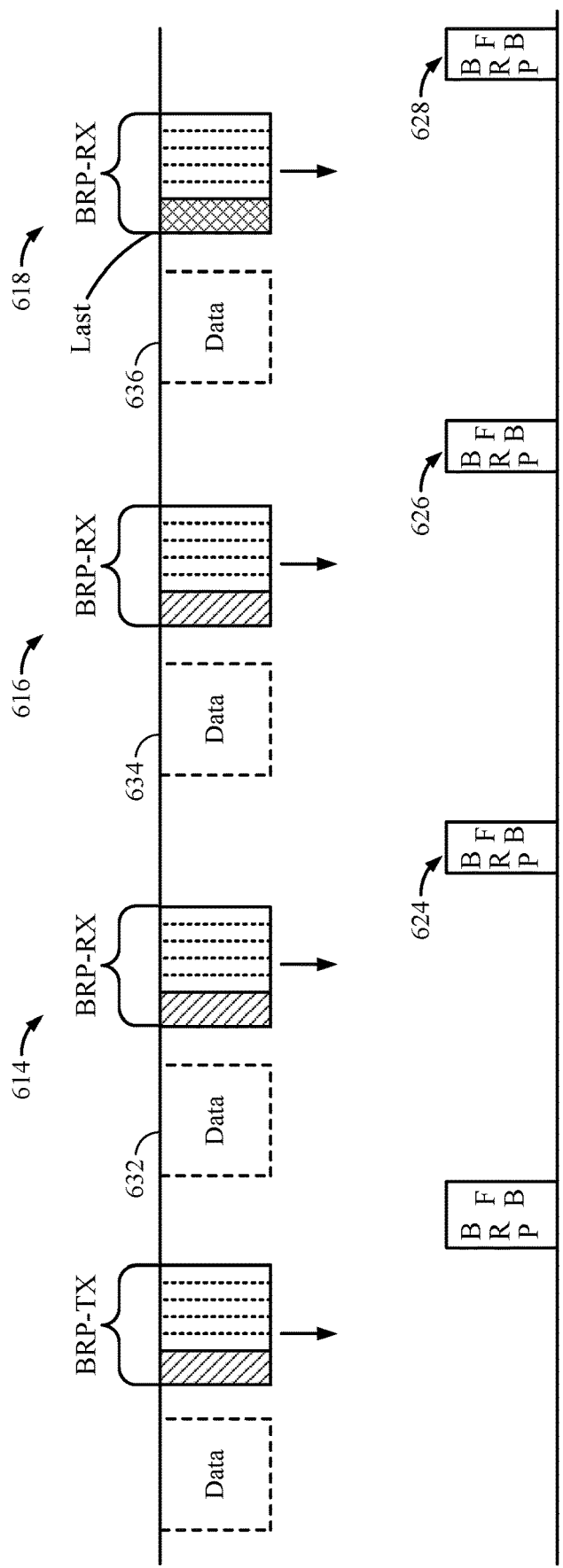
FIG. 8 illustrates an example split receive beam sector sweep using beam refinement frames, in accordance with certain aspects of the present disclosure.

For example, referring to FIG. 8, possibly after more data transmission(s) (e.g., data frame(s) 632) after receiving a BRP feedback packet 620 or 622 from the responder, the initiator may send a BRP RX packet 614, with an indication of whether it is the last packet or not. The packet may be sent using the best TX sector (e.g., reported in BRP feedback packet 620 or 622 or from previous training). In general, the responder may train its receive antenna (possibly not all combination) and respond with a BRP packet 624 indicating whether more training is needed.

In some cases, after more data transmission (data frame(s) 634), the initiator may send one or more other BRP-RX packets 616, in which it uses the best TX Sectors. The responder may receive the data part (e.g., using the previous best known RX pattern) and train its receiver on the TRAINING fields (e.g., evaluating different RX beamforming sectors with each TRN field). Again, the responder may respond to each BRP-RX frame with BRP feedback (or acknowledgment) packet (such as BRP feedback packet 626). After more possible data transmission (data frame(s) 636), and after the responder indicated that it does not need more training, the initiator may send a BRP-RX packet 618 with an indication that this is the last BRP-RX packet. The responder may respond to this last BRP-RX packet by sending a BRP-ACK packet 628 (e.g., an acknowledgement frame). After receiving this BRP-ACK packet, the initiator may switch transmission to the best TX sector and the responder may also switch to the best RX pattern it has found.

In a modification of the protocol, if the number of TRN fields requested by the responder for RX training can fit into a single packet, the initiator may send each packet using a different TX BF sector. For example, each of the different TX BF sectors may be selected by the initiator from the list it received from the responder. In such cases, in a last BRP-ACK packet, the responder may indicate which TX sector has the best quality.

As described herein, beamforming training may be performed using a transmit Sector Sweep based on TRN fields that are split over several BRP packets. As described above, this may help avoid large interruptions in data transmissions.

In some cases, an indication that the sector sweep has not finished yet may use a single bit (continues-SLS) in a control element, for example, in a EDMG-A header, an EMDG BRP request element, or a DMG BRP element. In some cases, the indication of the sector sweep state may use two bits. For example, two bits may be used to indicate the following states: a Start TX sector Sweep, Continuation of a TX sector sweep, or end of a TX sector sweep. In some cases, the indication of the sector sweep state may use one or more bits providing a countdown or a counter of the sector sweep frames. For instance, the indication of the first frame may be (N−1), where N is the total number of frames that are transmitted, and the remaining indications may countdown from (N−1), until the indication of the last frame is zero, providing an indication that the sector sweep is complete. The split protocol presented herein may allow for data transmission between the BRP packets of a single SLS. BRP-ACK frames (e.g., BRP packets with no requests) may be sent in response to each packet in the sweep, except the last frame in the sector sweep. After the last frame, a BRP ACK with a list of received sectors and (optionally) quality of each sector (e.g., SNR), and the size of the requested RX training (e.g., as a number of requested training fields).

The data part of all the packets may be transmitted using a best known TX pattern. The responder may receive all the data parts of the packet using the best know RX pattern but the TX training fields may be received using an omni-RX mode.

Similarly, RX training may be broken (split) in several BRP-RX packets. In such cases, an initiator may indicate, in each BRP-RX packet, whether that packet is/is not the last BRP-RX packet. In some cases, the indication in the BRP-RX packet may use one or more bits providing a countdown or a counter of the sector sweep frames. For instance, the indication of the first BRP-RX packet may be (N−1), where N is the total number of BRP-RX packets that are transmitted, and the remaining indications may countdown from (N−1), until the indication of the last BRP-RX packet is zero, providing an indication that the sector sweep is complete. As described above, a responder may, in turn, indicate in each response packet (BRP-ACK) whether or not more RX training is requested (e.g., using a new bit (more-RX) in the EDMG BRP request element). After the initiator sends a packet with an indication of a last packet in BRP-RX training, the responder may send a BRP-ACK with an indication that no further RX training is requested. After receiving this last BRP-ACK, the initiator may switch to the best TX sector for future communication with the responder. In turn, the responder may switch to the corresponding best RX pattern after sending the last BRP-ACK packet.

Aspects of the present disclosure also provide an option to send each of the BRP-RX packets using a different TX pattern. In such a mode, the responder may not request more RX training. Rather, the initiator may use one or more bits (of the unfinished SLS) to indicate that this combined TX and RX training has not finished. In the last ACK packet, the responder sends the best TX pattern.

Figure 9:
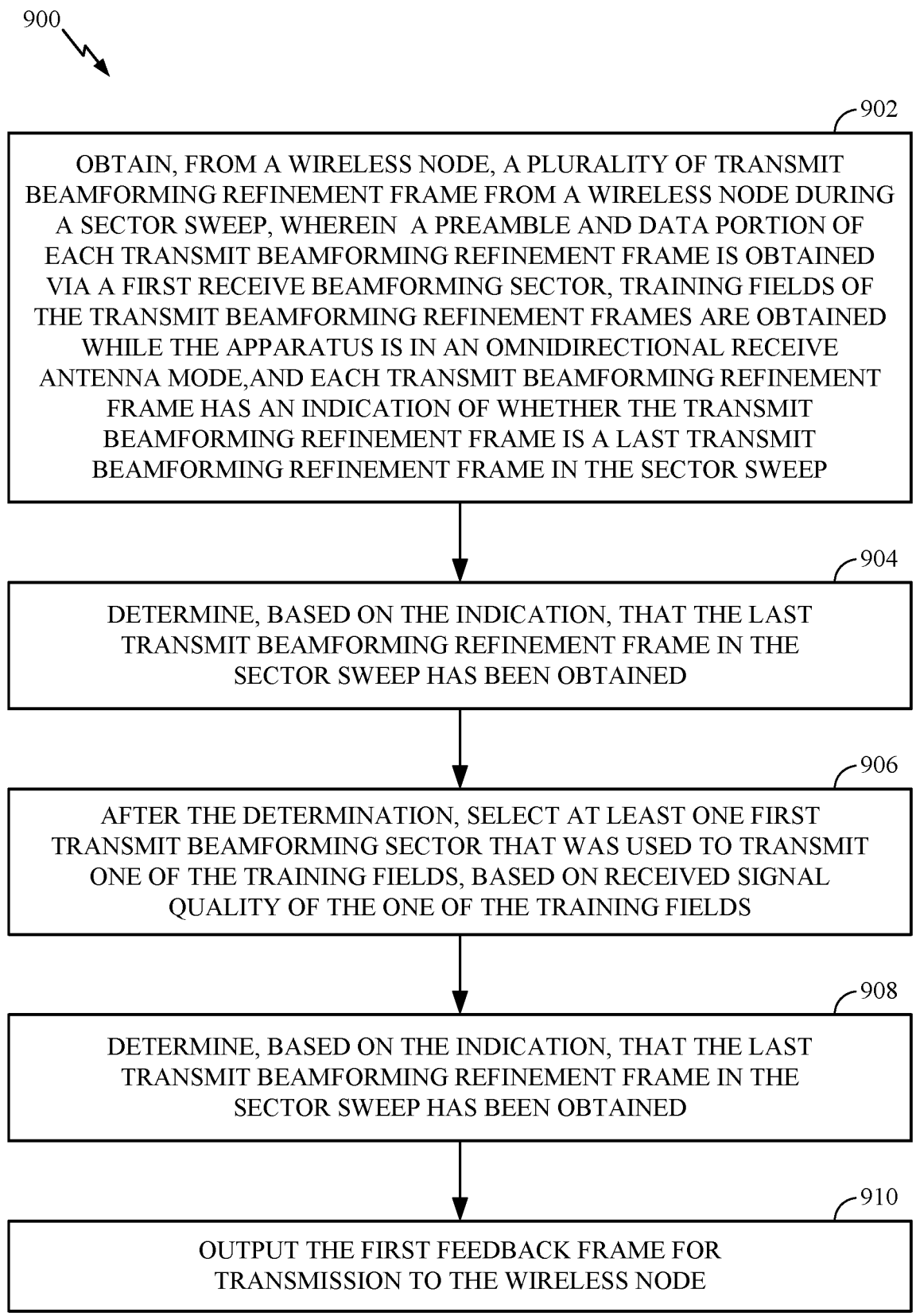
FIG. 9 illustrates example operations for performing transmit beamforming training by an initiator, in accordance with certain aspects of the present disclosure.
Figure 9A:
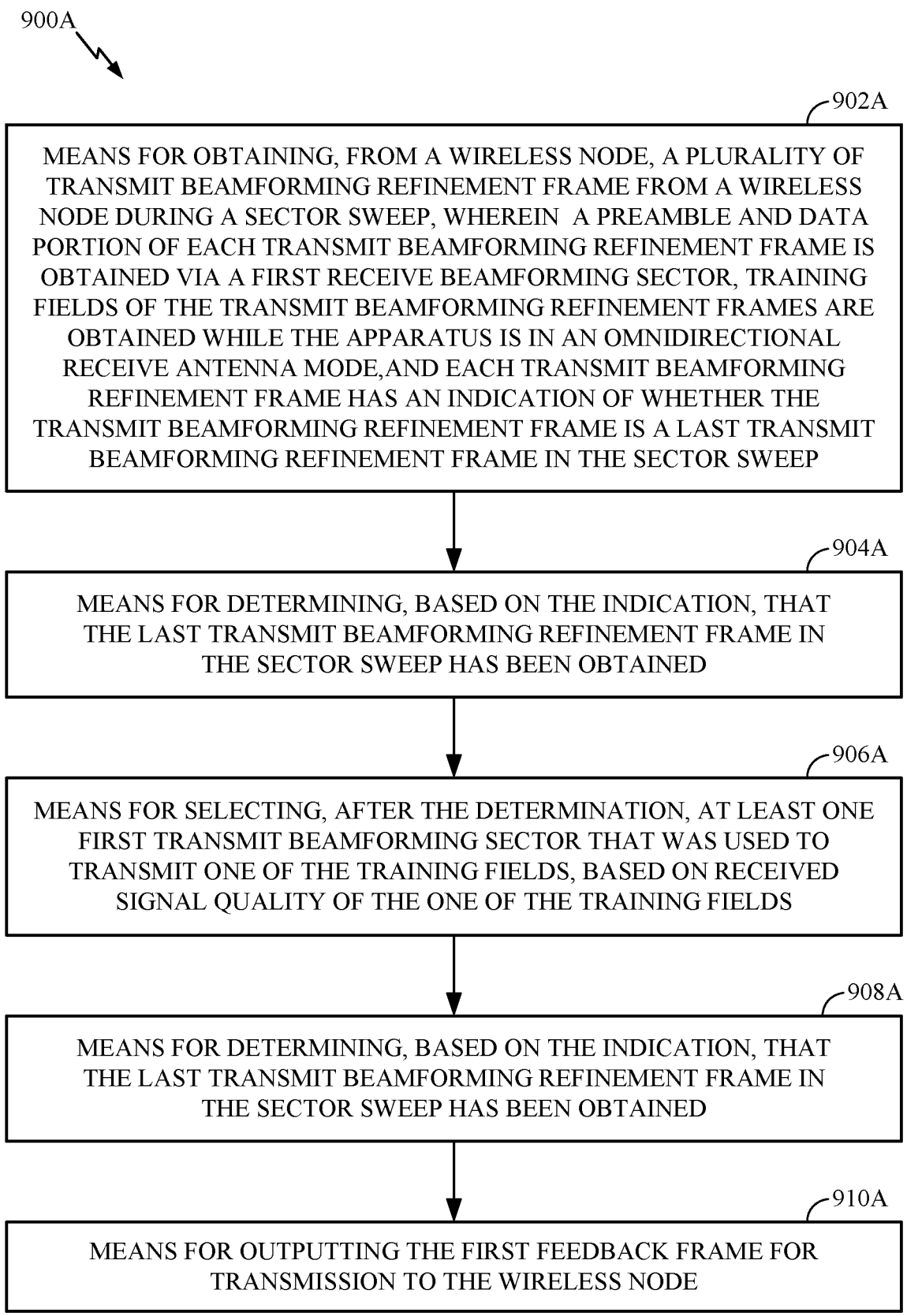
FIG. 9A illustrates example components capable of performing the operations shown in FIG. 9.

FIG. 9 illustrates example operations 900 for performing transmit beamforming training by an initiator, in accordance with certain aspects of the present disclosure. In other words, operations 900 may be performed by a responder performing beamforming training with an initiator performing operations 500 described above.

Operations 900 begin, at 902, by obtaining, from a wireless node, a plurality of transmit beamforming refinement frame from a wireless node during a sector sweep, wherein a preamble and data portion of each transmit beamforming refinement frame is obtained via a first receive beamforming sector, training fields of the transmit beamforming refinement frames are obtained while the apparatus is in an omnidirectional receive antenna mode, and each transmit beamforming refinement frame has an indication of whether the transmit beamforming refinement frame is a last transmit beamforming refinement frame in the sector sweep. In some cases, the indication of the transmit beamforming refinement frame may use one or more bits providing a countdown or a counter of the sector sweep frames. For instance, the indication of the first frame may be (N−1), where N is the total number of frames that are transmitted, and the remaining indications may countdown from (N−1), until the indication of the last frame is zero, providing an indication that the sector sweep is complete. At 904, the responder determines, based on the indication, that the last transmit beamforming refinement frame in the sector sweep has been obtained. At 906, the responder selects, after the determination, at least one first transmit beamforming sector that was used to transmit one of the training fields, based on received signal quality of the one of the training fields. At 908, the responder generates a first feedback frame indicating the selected first transmit beamforming sector. At 910, the responder outputs the first feedback frame for transmission to the wireless node.

Figure 10:
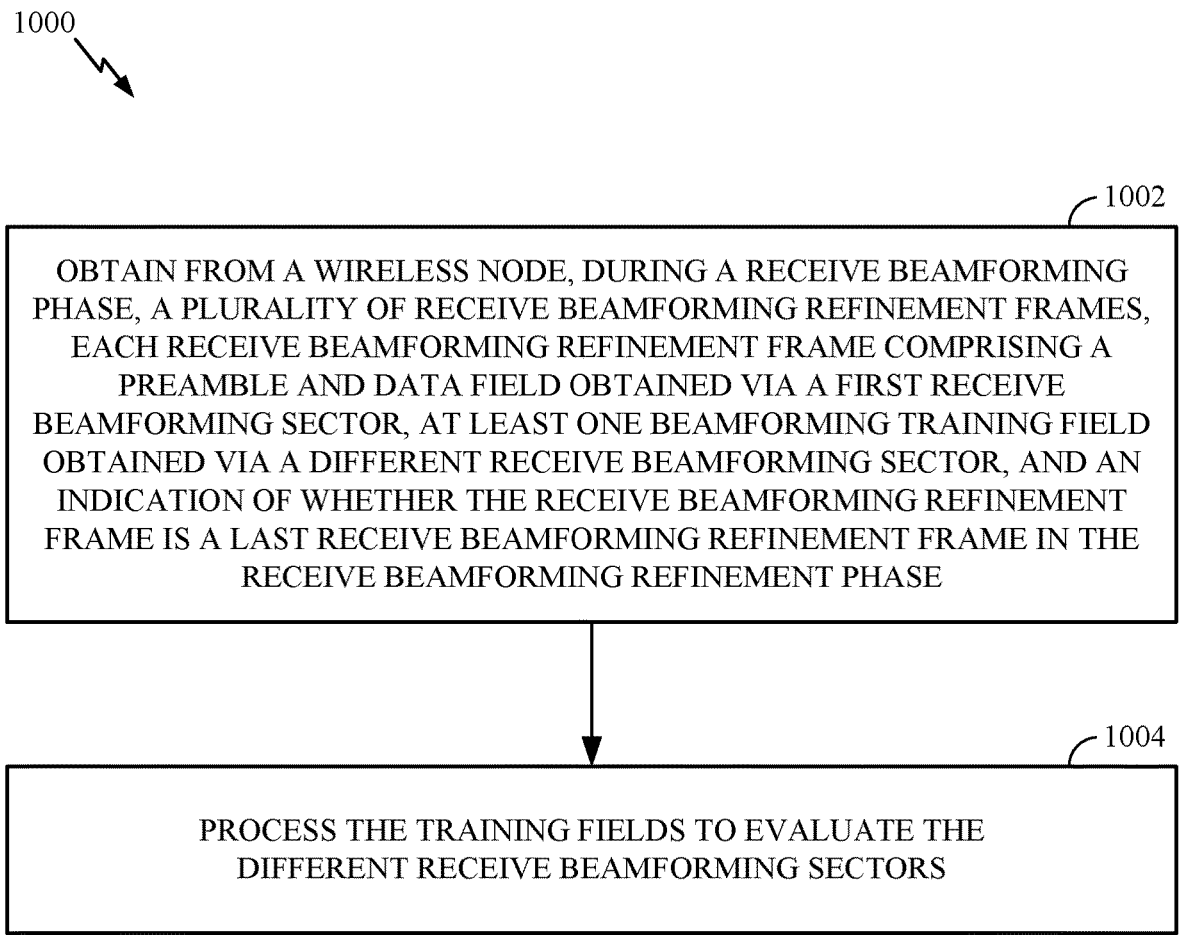
FIG. 10 illustrates example operations for performing receive beamforming training by an initiator, in accordance with certain aspects of the present disclosure.

FIG. 10 illustrates example operations 1000 for performing receive beamforming training by an initiator, in accordance with certain aspects of the present disclosure. In other words, operations 1000 may be performed by a responder performing beamforming training with an initiator performing operations 700 described above.

Operations 1000 begin, at 1002, by obtaining from a wireless node, during a receive beamforming phase, a plurality of receive beamforming refinement frames, each receive beamforming refinement frame comprising a preamble and data field obtained via a first receive beamforming sector, at least one beamforming training field obtained via a different receive beamforming sector, and an indication of whether the receive beamforming refinement frame is a last receive beamforming refinement frame in the receive beamforming refinement phase. In some cases, the indication of the receive beamforming refinement frame may use one or more bits providing a countdown or a counter of the sector sweep frames. For instance, the indication of the first frame may be (N−1), where N is the total number of frames that are transmitted, and the remaining indications may countdown from (N−1), until the indication of the last frame is zero, providing an indication that the sector sweep is complete. At 1004, the responder processes the training fields to evaluate the different receive beamforming sectors.

Figure 5A:
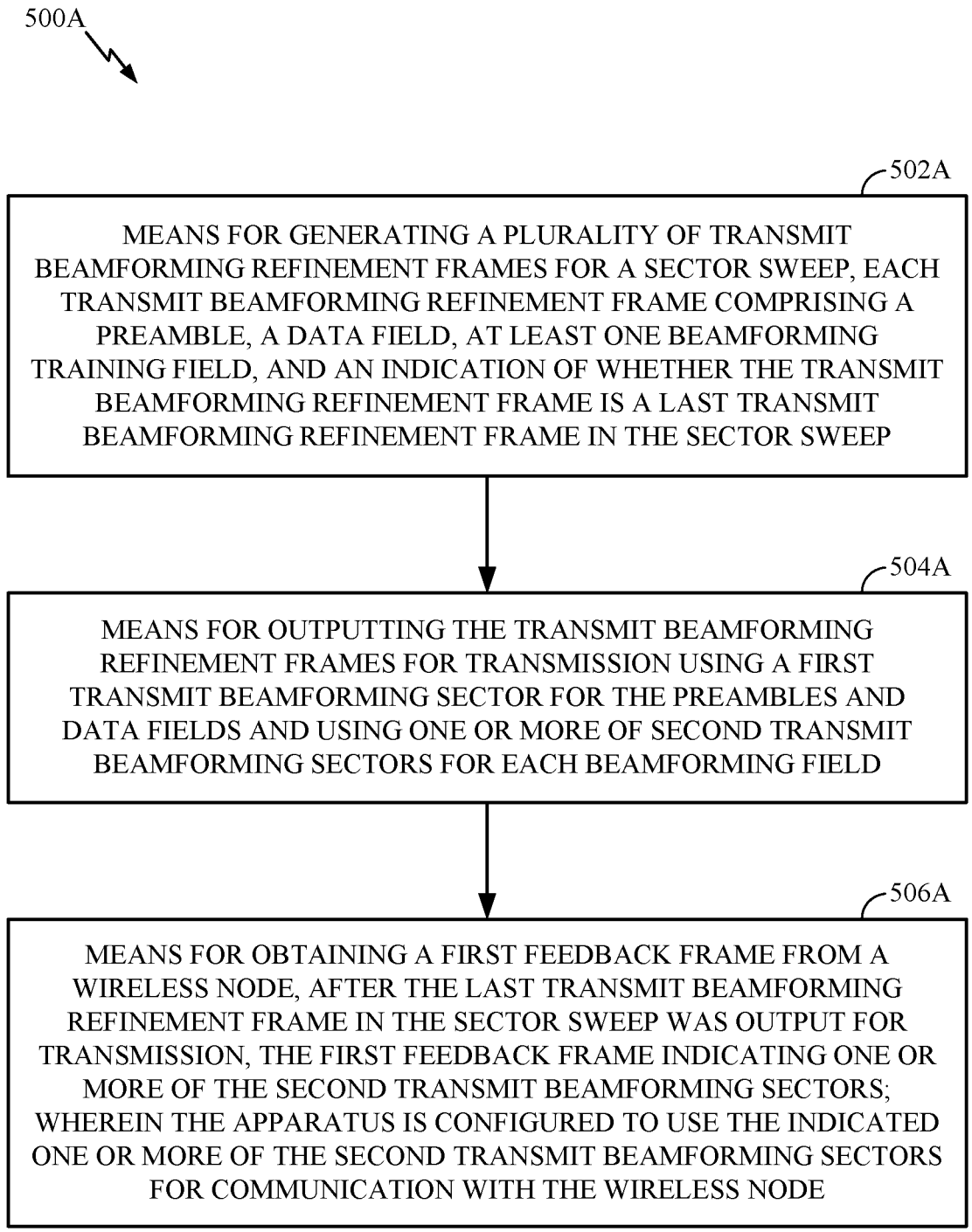
FIG. 5A illustrates example components capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500, 700, 900, and 1000 illustrated in FIGS. 5, 7, 9, and 10 correspond to means 500A, 700A, 900A, and 1000A illustrated in FIGS. 5A. 7A, 9A and 10A.

For example, means for exchanging, means for outputting, means for obtaining, or means for communicating may comprise a transmitter (e.g., the transmitter unit 222) and/or an antenna(s) 224 of the access point 110 or the transmitter unit 254 and/or antenna(s) 252 of the user terminal 120 illustrated in FIG. 2 and/or a receiver (e.g., the receiver unit 222) and/or an antenna(s) 224 of the access point 110 or the receiver unit 254 and/or antenna(s) 254 of the user terminal 120 illustrated in FIG. 2. Means for causing, means for processing, means for evaluating, means for selecting, means for determining, or means for generating may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to generate a plurality of transmit beamforming refinement frames for a sector sweep, each transmit beamforming refinement frame comprising a preamble, a data field, at least one beamforming training field, and an indication of whether the transmit beamforming refinement frame is a last transmit beamforming refinement frame in the sector sweep;
   a first interface configured to output the transmit beamforming refinement frames for transmission using a first transmit beamforming sector for the preambles and data fields and using one or more of second transmit beamforming sectors for each beamforming training field; and
   a second interface configured to obtain a first feedback frame from a wireless node, after the last transmit beamforming refinement frame in the sector sweep was output for transmission, the first feedback frame indicating one or more of the second transmit beamforming sectors, wherein the apparatus is configured to select at least one of the indicated one or more of the second transmit beamforming sectors for communication with the wireless node.

2. The apparatus of claim 1, wherein the first interface is configured to output the beamforming training fields for transmission via different sets of the second transmit beamforming sectors.

3. The apparatus of claim 1, wherein the indication of whether the transmit beamforming refinement frame is the last transmit beamforming refinement frame in the sector sweep is provided via a single bit.

4. The apparatus of claim 1, wherein the indication of whether the transmit beamforming refinement frame is the last transmit beamforming refinement frame in the sector sweep is provided via a plurality of bits, wherein the plurality of bits also indicate whether a corresponding transmit beamforming frame is at a start of the sector sweep or is a continuation of the sector sweep.

5. The apparatus of claim 1, wherein the indication of whether the transmit beamforming refinement frame is the last transmit beamforming refinement frame in the sector sweep is provided by a counter of the transmit beamforming refinement frames.

6. The apparatus of claim 1, wherein:
   the processing system is configured to generate one or more data frames; and
   the first interface is further configured to output the data frames for transmission, wherein each data frame is output for transmission between at least two of the transmit beamforming refinement frames.

7. The apparatus of claim 1, wherein:
   the second interface is further configured to obtain one or more first acknowledgment frames from the wireless node, each acknowledging one of the transmit beamforming refinement frames;
   the processing system is configured to generate a subsequent transmit beamforming refinement frame after obtaining the one or more first acknowledgement frames; and
   the first interface is further configured to output the subsequent transmit beamforming refinement frame for transmission.

8. The apparatus of claim 1, wherein:
   the first feedback frame also has an indication of a receive signal quality of each of the indicated second transmit beamforming sectors; and
   the selection is based on corresponding receive signal quality.

9. The apparatus of claim 1, wherein:
   the first feedback frame also includes a request for a receive beamforming training phase;
   the processing system is further configured to generate, in response to the request, a plurality of receive beamforming refinement frames, each receive beamforming refinement frame comprising a preamble, a data field, at least one beamforming training field, and an indication of whether the receive beamforming refinement frame is a last receive beamforming refinement frame in the receive beamforming refinement phase; and
   the first interface is further configured to output the receive beamforming refinement frames for transmission using at least one of the first transmit beamforming sector or one of the second transmit beamforming sectors indicated in the first feedback frame.

10. The apparatus of claim 9, wherein:
    the second interface is further configured to obtain a second acknowledgement frame from the wireless node, after the last receive beamforming refinement frame in the receive beamforming refinement phase is output for transmission; and
    the apparatus is configured to communicate with the wireless node using one of the second transmit beamforming sectors indicated in the first feedback frame after obtaining the second acknowledgment frame.

11. The apparatus of claim 9, wherein:
    the first feedback frame also indicates a requested number of training fields for the receive beamforming refinement phase; and
    the processing system is configured to include the requested number of training fields, in the receive beamforming refinement frames.

12. The apparatus of claim 9, wherein the first interface is configured to output each of the receive beamforming refinement frames using a different third transmit beamforming sector.

13. The apparatus of claim 12, wherein the different third transmit beamforming sectors are selected from the second transmit beamforming sectors indicated in the first feedback frame.

14. The apparatus of claim 12, wherein:
the second interface is further configured to obtain a second acknowledgement frame from the wireless node, after the last receive beamforming refinement frame in the receive beamforming refinement phase was output for transmission, the second acknowledgment frame indicating one of the third transmit beamforming sectors; and
the apparatus is configured to communicate with the wireless node using the indicated third transmit beamforming sector after obtaining the second acknowledgment frame.

15. The apparatus of claim 9, wherein:
the processing system is configured to generate one or more data frames; and
the first interface is further configured to output the data frames for transmission, wherein each data frame is output for transmission between at least two of the receive beamforming refinement frames.

16. An apparatus for wireless communications, comprising:
a processing system configured to generate a plurality of receive beamforming refinement frames, each receive beamforming refinement frame comprising a preamble, a data field, at least one beamforming training field, and an indication of whether the receive beamforming refinement frame is a last receive beamforming refinement frame in a receive beamforming refinement phase; and
a first interface is configured to output the receive beamforming refinement frames for transmission using at least one first transmit beamforming sector.

17. The apparatus of claim 16, further comprising:
a second interface configured to obtain a first acknowledgement frame from a wireless node, after the last receive beamforming refinement frame in the receive beamforming refinement phase was output for transmission; and
the apparatus is configured to communicate with the wireless node using a second transmit beamforming sector after obtaining the first acknowledgment frame.

18. The apparatus of claim 16, wherein the indication of whether the receive beamforming refinement frame is the last receive beamforming refinement frame in the receive beamforming refinement phase is provided via a single bit.

19. The apparatus of claim 16, wherein the indication of whether the receive beamforming refinement frame is the last receive beamforming refinement frame in the receive beamforming refinement phase is provided via a plurality of bits, wherein the plurality of bits also indicate whether a corresponding receive beamforming frame is at a start of the receive beamforming refinement phase or is a continuation of the receive beamforming refinement phase.

20. The apparatus of claim 16, wherein the indication of whether the receive beamforming refinement frame is the last receive beamforming refinement frame in the receive beamforming refinement phase is provided by a counter of the receive beamforming refinement frames.

21. The apparatus of claim 16, wherein:
the processing system is configured to generate one or more data frames; and
the first interface is further configured to output the data frames for wherein each data frame is output for transmission between at least two of the receive beamforming frames.

22. The apparatus of claim 16, further comprising:
a second interface configured to obtain a first feedback frame including a requested number of training fields for the receive beamforming refinement phase, wherein the processing system is configured to include the requested number of training fields, collectively, in the receive beamforming refinement frames.

23. An apparatus for wireless communications, comprising:
a first interface configured to obtain a plurality of transmit beamforming refinement frames during a sector sweep, wherein
a first portion of each transmit beamforming refinement frame is obtained via a first receive beamforming sector,
training fields of the transmit beamforming refinement frames are obtained while the apparatus is in an omnidirectional receive antenna mode,
each transmit beamforming refinement frame has an indication of whether the transmit beamforming refinement frame is a last transmit beamforming refinement frame in the sector sweep, and
a processing system configured to
determine the sector sweep is over after identifying the last transmit beamforming refinement frame based on the indication contained therein,
in response to the determination,
select at least one first transmit beamforming sector that was used to transmit one of the training fields, based on received signal quality of the one of the training fields, and
generate a first feedback frame indicating the selected at least one first transmit beamforming sector; and
a second interface configured to output the first feedback frame for transmission.

24. The apparatus of claim 23, wherein the first interface is configured to obtain the indication of each beamforming refinement frame via a single bit.

25. The apparatus of claim 23, wherein the first interface is configured to obtain the indication of each beamforming refinement frame via a plurality of bits, wherein the plurality of bits also indicates whether a corresponding transmit beamforming frame is at a start of the sector sweep or is a continuation of the sector sweep.

26. The apparatus of claim 23, wherein the first interface is configured to obtain the indication of each beamforming refinement frame via a counter of the transmit beamforming refinement frames.

27. The apparatus of claim 23, wherein:
the first interface is further configured to obtain one or more data frames, each data frame being obtained between two of the transmit beamforming refinement frames; and
the processing system is further configured to process the data frames.

28. The apparatus of claim 23, wherein:
the processing system is further configured to generate one or more first acknowledgment frames, each first acknowledgment frame acknowledging one of the transmit beamforming refinement frames; and
the second interface is further configured to output the first acknowledgment frames for transmission.

29. The apparatus of claim 23, wherein the first feedback frame also has an indication of a receive signal quality of each of the selected at least one first transmit beamforming sector.

30. The apparatus of claim 23, wherein:
the first feedback frame also includes a request for a receive beamforming training phase; the first interface is further configured to obtain, in response to the request, a plurality of receive beamforming refinement frames, each receive beamforming refinement frame comprising a first portion obtained via the first receive beamforming sector, at least one beamforming training field obtained via one or more second receive beamforming sectors, and an indication of whether the receive beamforming refinement frame is a last receive beamforming refinement frame in the receive beamforming refinement phase; and
the processing system is configured to process the training fields to select one or more of the second receive beamforming sectors for use in communication with a wireless node.

31. The apparatus of claim 30, wherein:
the processing system is further configured generate a second acknowledgement frame, after obtaining the last receive beamforming refinement frame in the receive beamforming refinement phase;
the second interface is further configured to output the second acknowledgment frame for transmission; and
the apparatus is configured to communicate with the wireless node using one of the selected second receive beamforming sectors after obtaining the second acknowledgment frame.

32. The apparatus of claim 30, wherein:
the first feedback frame also indicates a requested number of training fields for the receive beamforming refinement phase; and
the processing system is configured to process the requested number of training fields obtained, collectively, in the receive beamforming refinement frames, using different receive beamforming sectors.

33. The apparatus of claim 30, wherein:
the processing system is further configured to generate a second acknowledgement frame, after obtaining the last receive beamforming refinement frame in the receive beamforming refinement phase, the second acknowledgment frame indicating at least one beamforming sector that was used to transmit one of the receive beamforming refinement frames; and
the second interface is configured to output the second acknowledgment frame for transmission.

34. The apparatus of claim 30, wherein:
the first interface is further configured to obtain one or more data frames, wherein each data frame is obtained between two receive beamforming refinement frames; and
the processing system is further configured to process the data frames.

35. An apparatus for wireless communications, comprising:
a first interface configured to obtain from a wireless node, during a receive beamforming phase, a plurality of receive beamforming refinement frames, each receive beamforming refinement frame comprising a first portion obtained via a receive beamforming sector, at least one of the plurality of beamforming training frames being obtained via a different receive beamforming sector than at least another of the plurality of beamforming training frames, and wherein each of the plurality of receive beamforming refinement frames comprises an indication of whether the receive beamforming refinement frame is a last receive beamforming refinement frame in the receive beamforming refinement phase; and
a processing system configured to process the plurality of beamforming training frames to select one of the different receive beamforming sectors for use in communication with the wireless node.

36. The apparatus of claim 35, wherein:
the processing system is further configured to generate a first acknowledgement frame, after obtaining the last receive beamforming refinement frame in the receive beamforming refinement phase; and
the apparatus further comprises a second interface configured to output the first acknowledgment frame for transmission.

37. The apparatus of claim 35, wherein the first interface is configured to obtain the indication of whether the receive beamforming refinement frame is the last receive beamforming refinement frame in the receive beamforming refinement phase via a single bit.

38. The apparatus of claim 35, wherein the first interface is configured to obtain the indication of whether the receive beamforming refinement frame is the last receive beamforming refinement frame in the receive beamforming refinement phase via a plurality of bits, wherein the plurality of bits also indicate whether a corresponding receive beamforming frame is at a start of the receive beamforming refinement phase or is a continuation of the receive beamforming refinement phase.

39. The apparatus of claim 35, wherein the first interface is configured to obtain the indication of each beamforming refinement frame via a counter of the receive beamforming refinement frames.

40. The apparatus of claim 35, wherein:
the first interface is further configured to obtain one or more data frames, each data frame being obtained between two of the receive beamforming refinement frames; and
the processing system is further configured to process the data frames.

41. The apparatus of claim 35, wherein:
the processing system is further configured to generate a first feedback frame, the first feedback frame including a requested number of training fields for the receive beamforming refinement phase;
the apparatus further comprises a second interface configured to output the first feedback frame for transmission to the wireless node; and
the processing system is configured to evaluate the receive beamforming sectors by processing the requested number of training fields obtained, in the receive beamforming refinement frames.

42. The apparatus of claim 35, wherein:
the processing system is further configured to generate a first acknowledgement frame, after obtaining the last receive beamforming refinement frame in the receive beamforming refinement phase, the first acknowledgment frame indicating at least one beamforming sector that was used by the wireless node to transmit one of the receive beamforming refinement frames; and
the apparatus further comprises a second interface further configured to output the first acknowledgment frame for transmission to a wireless device.

* * * * *